United States Patent
Nishi (10) Patent No.: US 9,715,227 B2
(45) Date of Patent: Jul. 25, 2017

(54) ROBOT CONTROLLER HAVING FUNCTION OF PREDICTING PROCESSING COMPLETION TIME OF MACHINE TOOL

(71) Applicant: FANUC Corporation, Yamanashi (JP)

(72) Inventor: Hiroji Nishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 315 days.

(21) Appl. No.: 14/658,514

(22) Filed: Mar. 16, 2015

(65) Prior Publication Data
US 2015/0268659 A1 Sep. 24, 2015

(30) Foreign Application Priority Data

Mar. 24, 2014 (JP) .................................. 2014-060613

(51) Int. Cl.
*G05B 19/401* (2006.01)
*G05B 15/02* (2006.01)
*G05B 19/418* (2006.01)

(52) U.S. Cl.
CPC .......... *G05B 19/401* (2013.01); *G05B 15/02* (2013.01); *G05B 19/41815* (2013.01); *G05B 19/41865* (2013.01); *G05B 2219/31076* (2013.01); *G05B 2219/31078* (2013.01); *G05B 2219/39358* (2013.01); *Y02P 90/083* (2015.11); *Y02P 90/087* (2015.11); *Y02P 90/20* (2015.11); *Y10S 901/41* (2013.01)

(58) Field of Classification Search
CPC G05B 19/401; G05B 19/41865; G05B 15/02; G05B 19/41815; G05B 2219/39358; G05B 2219/31078; G05B 2219/31076; Y02P 90/087; Y02P 90/083; Y02P 90/20; Y10S 901/41
USPC ................................................. 700/228, 114
See application file for complete search history.

(56) References Cited

U.S. PATENT DOCUMENTS 6,351,686 B1 * 2/2002 Iwasaki .................. F02M 5/125
                                                           700/121
2007/0271766 A1   11/2007 Bickersteth et al.
2009/0088895 A1 * 4/2009 Schmidt ........... G05B 19/41865
                                                           700/228

(Continued)

FOREIGN PATENT DOCUMENTS

CN          101231517 A       7/2008
CN          102455679 A       5/2012
(Continued)

*Primary Examiner* — Kenneth M Lo
*Assistant Examiner* — David Wynne
(74) *Attorney, Agent, or Firm* — Hauptman Ham, LLP (57) ABSTRACT

The robot controller includes an operation command part configured to output an operation command so as to perform a first operation of conveying a workpiece from an initial position to a first position adjacent to the machine tool, a time prediction part configured to predict processing completion time of the workpiece based on a processing start signal output from a machine tool controller, a time length prediction part configured to predict time length necessary for the first operation, and a time determination part configured to determine start time of the first operation so that the first operation is completed at the processing completion time on the basis of the predicted processing completion time and time length necessary for the first operation.

2 Claims, 4 Drawing Sheets

(56) References Cited

U.S. PATENT DOCUMENTS

2009/0288287 A1  11/2009  Horn et al.

FOREIGN PATENT DOCUMENTS

| JP | 62-264852 A | 11/1987 |
| JP | 5-50358 A | 3/1993 |
| JP | 2002-113639 A | 4/2002 |
| JP | 2005-149216 A | 6/2005 |
| JP | 2009-43950 A | 2/2009 |
| JP | 2010-247267 A | 11/2010 |
| JP | 2010-264559 A | 11/2010 |
| JP | 2012-243009 A | 12/2012 |

\* cited by examiner

| | TYPE | MACHINE TOOL | PROCESSING START TIME | PROCESSING COMPLETION TIME | PREPARATION START TIME | PREPARATION COMPLETION TIME |
|---|---|---|---|---|---|---|
| D1 | A | X | T11 | T12 | T13 | T14 |
| D2 | B | Y | T21 | T22 | T23 | T24 |
| D3 | A | X | T31 | T32 | T33 | T34 |
| D4 | B | Y | T41 | T42 | T43 | T44 |
| D5 | A | X | T51 | T52 | T53 | T54 |
| D6 | B | Y | T61 | T62 | T63 | T64 |
| D7 | A | X | T71 | T72 | T73 | T74 |

FIG. 4

ROBOT CONTROLLER HAVING FUNCTION OF PREDICTING PROCESSING COMPLETION TIME OF MACHINE TOOL

FIELD OF THE INVENTION

1. Technical Field

The present invention relates to a robot controller having a function of predicting processing completion time of a machine tool.

2. Description of the Related Art

In general, when a workpiece is conveyed to the machine tool by using a robot, a workpiece replacing request signal is output from the machine tool to the robot controller after completion of processing operation for a workpiece, and the robot starts a workpiece replacing preparation operation after receiving the workpiece replacing request signal. However, when the robot starts the workpiece replacing preparation operation after receiving the workpiece replacing request signal, the machine tool is set in a standby state without performing any processing during the workpiece replacing preparation operation, and consequently reduced in operation rate. On the other hand, there is known a device configured such that the workpiece replacing preparation operation of the robot is started before a start of processing operation for a workpiece and, after completion of the workpiece replacing preparation operation, the robot is put on standby until processing operation for a workpiece is completed and then a replacing request signal is output (e.g., refer to Japanese Laid-open Patent Publication No. 2005-149216). However, when the robot is set on standby until a replacing request signal is output as in the case of the device described in Japanese Laid-open Patent Publication No. 2005-149216, an operation rate of the robot is reduced.

SUMMARY OF THE INVENTION

According to a first aspect of the present invention, there is provided a processing system including a machine tool controller for controlling a machine tool, and a robot controller for controlling a robot. The machine tool controller includes a signal output part configured to output a processing start signal at the processing start time of a workpiece. The robot controller includes an operation command part configured to output an operation command of the robot so as to perform a first operation of conveying the workpiece from an initial position to a first position adjacent to the machine tool and a second operation of conveying the workpiece conveyed to the first position to a second position in a processing region of the machine tool, a time prediction part configured to predict processing completion time of the workpiece in the machine tool based on the processing start signal output from the signal output part, a time length prediction part configured to predict time length necessary for the first operation of the robot, and a time determination part configured to determine start time of the first operation so that the first operation is completed at the processing completion time based on the processing completion time predicted by the time prediction part and the time length predicted by the time length prediction part.

BRIEF DESCRIPTION OF THE DRAWINGS

These and other objects, features, and advantages of the present invention will become more apparent from the following detailed description of the exemplary embodiments of the present invention taken in connection with the accompanying drawings, in which.

DETAILED DESCRIPTION

Figure 1:
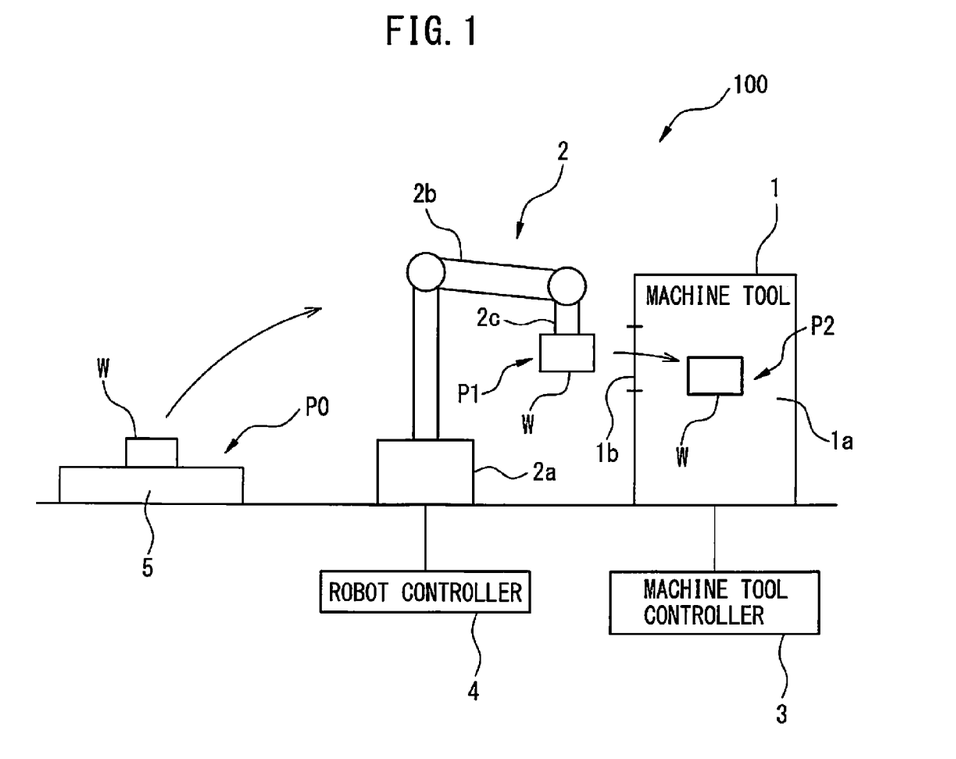
FIG. 1 is a diagram schematically illustrating a configuration of a processing system according to an embodiment of the present invention.

Hereinafter, embodiments of the present invention will be described referring to FIGS. 1 to 4. FIG. 1 is a diagram schematically illustrating a configuration of a processing system 100 according to an embodiment of the present invention. The processing system 100 includes a machine tool 1 for processing a workpiece W, a robot 2 for conveying the workpiece W to the machine tool 1, a machine tool controller 3 for controlling the machine tool 1, and a robot controller 4 for controlling the robot 2. The processing system 100 automatically conveys the workpiece W to the machine tool 1 by using the robot 2, and the workpiece W is processed by the machine tool 1. Although not illustrated in the figures, the processing system 100 includes a plurality (e.g., two) of machine tools 1 (first machine tool X and second machine tool Y), and the plurality of machine tools 1 perform similar or different processing operations.

The robot 2 is, for example, a vertical articulated industrial robot. The robot 2 includes a base 2a, an arm 2b rotatably supported on the base 2a, and a gripper 2c provided at a front edge part of the arm 2b, and the workpiece W is gripped by the gripper 2c. The robot 2 is driven by a servo motor 20 illustrated in FIG. 2, and can move the workpiece W.

The machine tool 1 is, for example, a numerically controlled machine tool such as a machining center, and disposed on a side of the robot 2. A tip of the robot 2 can move into or out of a processing region 1a in the machine tool 1 through an openable/closable door 1b. The machine tool 1 holds, according to a command from the machine tool controller 3, the workpiece W supplied into the processing region 1a on a processing table of the machine tool 1, and processes (e.g., cuts) the workpiece W. The workpiece W may be processed without using the processing table.

A workpiece mounting stand 5 is disposed in a workpiece mounting station on the side of the robot 2, and the workpiece W yet to be processed is mounted on the workpiece mounting stand 5. A position of the workpiece W mounted on the workpiece mounting stand 5 is referred to as an initial position P0. The robot 2 grips the workpiece W on the workpiece mounting stand 5 according to a command from the robot controller 4, and conveys the workpiece W from the initial position P0 to a first position P1 adjacent to the machine tool 1. The conveying operation of the workpiece W from the initial position P0 to the first position P1 is referred to as a preparation operation.

The robot 2 further conveys the workpiece W from the first position P1 to a second position P2 in the processing region 1a of the machine tool 1, and replaces the workpiece W interlockingly with the machine tool 1. In other words, the workpiece W yet to be processed is fed to the machine tool 1, and the processed workpiece W is received from the machine tool 1. The conveying operation of the workpiece W from the first position P1 to the second position P2 is referred to as a workpiece replacing operation.

In the processing system 100 configured as described above, according to a command from the machine tool controller 3, the door 1b of the machine tool 1 is closed during processing operation for workpiece, and opened after completion of processing operation for the workpiece W. Thus, the workpiece replacing operation of the robot 2 via the door 1b is enabled after the completion of processing operation for the workpiece W. In this case, when the robot 2 starts the preparation operation after the completion of processing operation for the workpiece W, standby time of the machine tool 1 without executing any processing is longer, and thus an operation rate of the machine tool 1 is reduced.

On the other hand, when the robot 2 starts the preparation operation simultaneously with the processing start of the workpiece W, standby time until the replacing operation after completion of the preparation operation is longer, and thus an operation rate of the robot 2 is reduced. In other words, the robot 2 carries out not only the preparation operation and the workpiece replacing operation but also an operation related to other work (other work operation). The other work is, for example, size measurement of the processed workpiece W, deburring, cleaning, or conveying to the workpiece mounting station where the processed workpiece W is mounted. Accordingly, in order to create the efficient processing system 100, the standby time is preferably shortened to cause the robot 2 to carry out other work. Thus, according to the embodiment, the processing system 100 is configured as described below.

Figure 2:
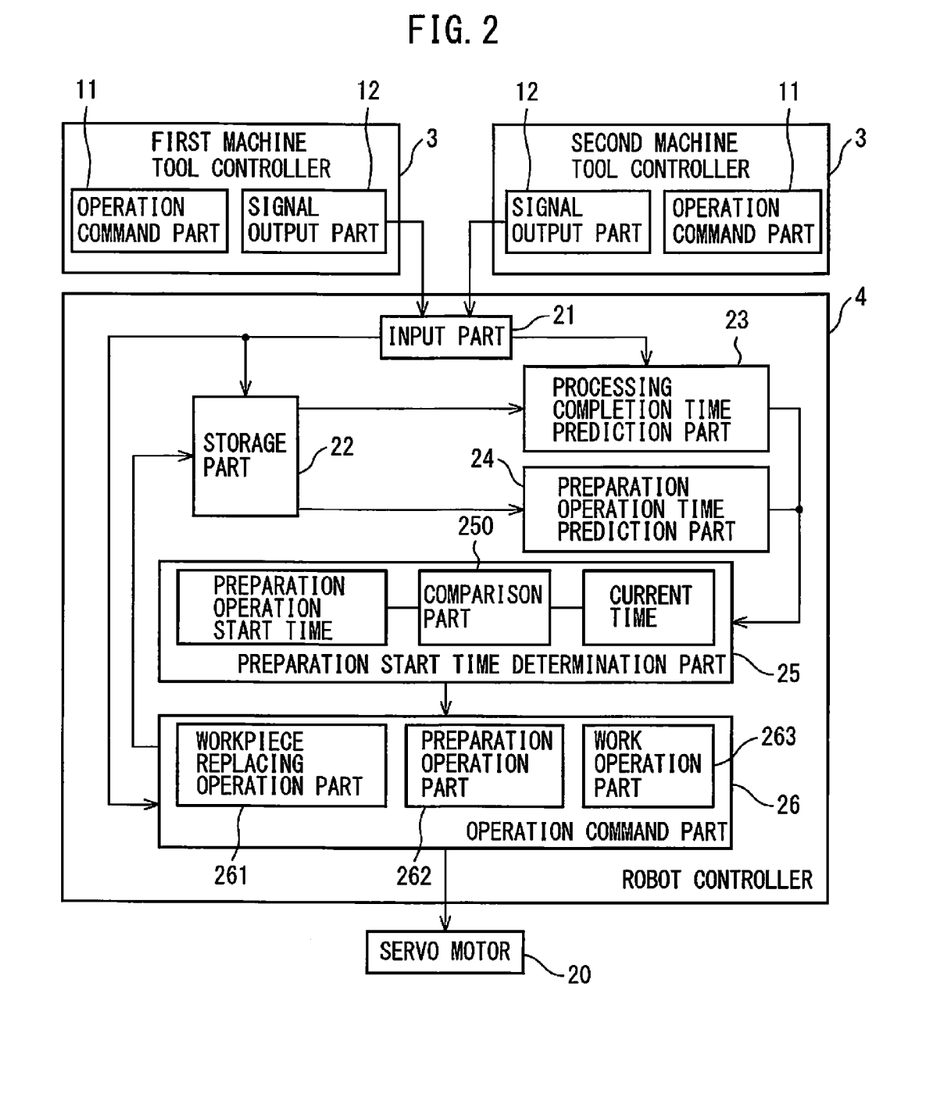
FIG. 2 is a block diagram illustrating a control configuration of the processing system according to the embodiment of the present invention.

FIG. 2 is a block diagram illustrating a control configuration of the processing system 100 according to the embodiment of the present invention. As illustrated in FIG. 2, the machine tool controller 3 of each of the first and second machine tools 1 includes an operation command part 11 configured to output an operation command to an actuator of each machine tool 1, and a signal output part 12. The signal output part 12 outputs a processing start signal at the processing starting time of the workpiece W, and a processing completion signal at the processing completion time of the workpiece W. The signal output part 12 also outputs a workpiece identification signal according to the type of the workpiece W. The operation command part 11 outputs an opening signal to a door driving actuator when the processing completion signal is output to open the door 1b. Accordingly, the workpiece replacing operation of the robot 2 is enabled.

The robot controller 4 includes an input part 21, a storage part 22, a processing completion time prediction part 23, a preparation operation time prediction part 24, a preparation start time determination part 25, and an operation command part 26. The processing start signal, the processing completion signal, and the workpiece identification signal are input from the signal output part 12 to the input part 21. The inputting time of the processing start signal and the inputting time of the processing completion signal respectively correspond to processing start time and processing completion time.

The storage part 22 stores processing start time and processing completion time for each type of a workpiece W based on a signal input via the input part 21. The storage part 22 also stores time of starting a preparation operation (preparation start time) and time of completing the preparation operation (preparation completion time) of the robot 2.

Figure 3:
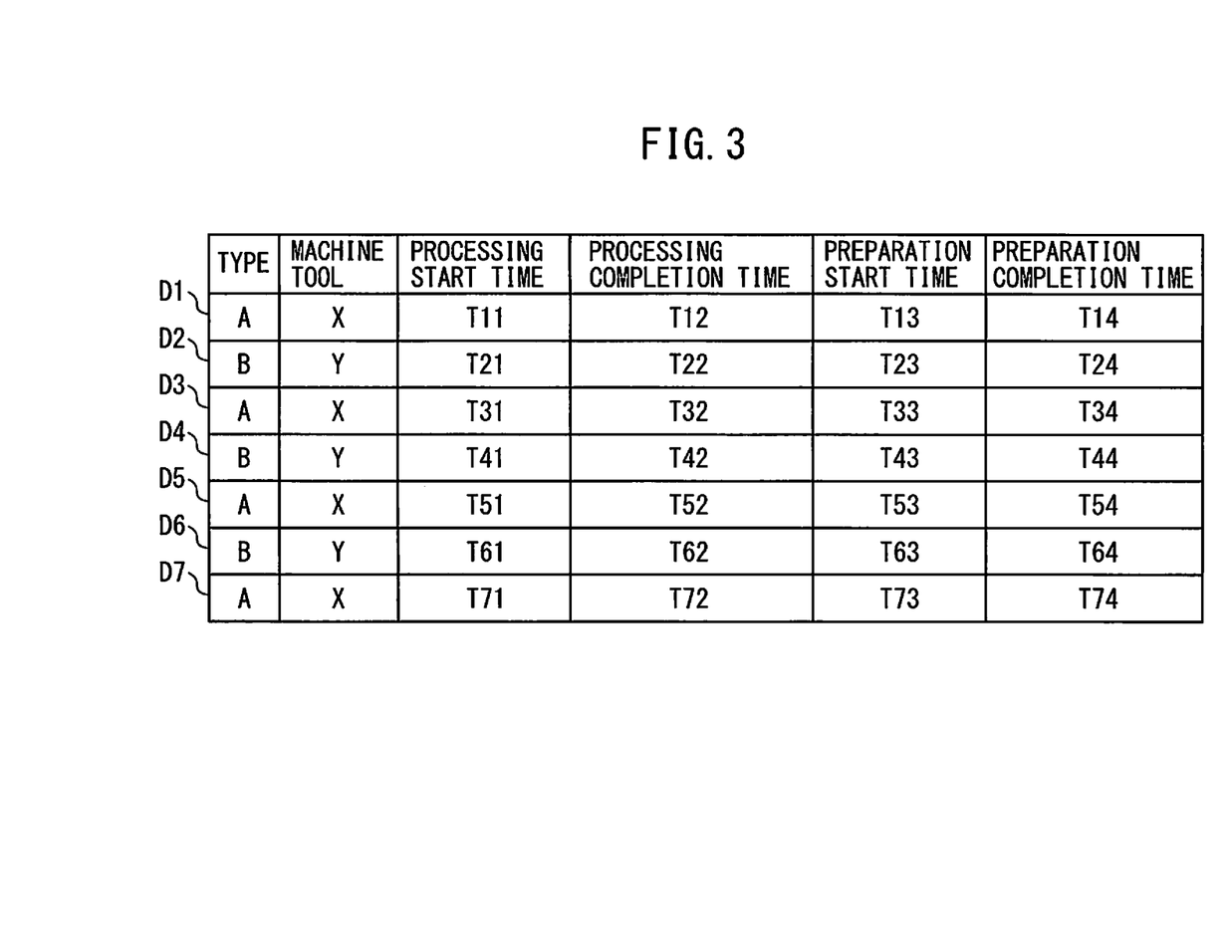
FIG. 3 is a table illustrating an example of processing data stored in a storage part illustrated in FIG. 2.

FIG. 3 is a table illustrating an example of processing data stored in the storage part 22, in other words, data acquired by processing operation for a workpiece. As illustrated in FIG. 3, the storage part 22 stores a plurality of sets (7 sets in FIG. 3) of processing data D1 to D7 corresponding to a plurality of processed workpieces W. Each set of processing data D1 to D7 includes processing start time, processing completion time, preparation start time, and preparation completion time, and the processing data are stored together with types of workpieces W (A and B) and types of machine tools 1 which have been processed workpieces (first machine tool X and second machine tool Y).

When the processing start signal is input from the signal output part 12 to the input part 21, the processing completion time prediction part 23 specifies a type of a currently processed workpiece W and a machine tool 1 processing the workpiece W on the basis of the processing start signal. Then, among the data stored in the storage part 22, a set of processing data of workpieces W of the same type acquired by the same machine tool 1 is retrieved, and processing time that is a difference between processing completion time and processing start time included in the set of processing data is calculated.

In the example illustrated in FIG. 3, when the type of the workpiece W is A and the machine tool 1 is X, a plurality of sets of processing data D1, D3, D5, and D7 are retrieved, and processing times (T12−T11, T32−T31, T52−T51, and T72−T71) are calculated from the plurality of sets of processing data D1, D3, D5, and D7. In this case, the processing completion time prediction part 23 calculates an average value among the four processing times as processing time. Then, the processing completion time prediction part 23 adds the processing time (average value) to current time when the processing start time is input, and predicts that this time is processing completion time.

The preparation operation time prediction part 24 retrieves, among the processing data stored in the storage part 22, a set of processing data when workpieces W of the same type are conveyed to the machine tool 1 of the same type, and calculates preparation operation time that is a difference between preparation start time and preparation completion time included in the set of processing data. When a plurality of sets of processing data are retrieved and a plurality of preparation operation times are calculated, the preparation operation time prediction part 24 predicts that an average value thereof is preparation operation time. For example, when a type of a workpiece W currently processed by the machine tool 1 is A and a type of a workpiece W conveyed to the machine tool 1 is B, the preparation operation time is calculated based on processing data of the type B. In other words, when the type of the currently processed workpiece W and the type of the workpiece W conveyed to the machine tool 1 are different, the preparation operation time prediction part 24 predicts the preparation operation time based on a set of processing data different from that used by the processing completion time prediction part 23.

The preparation start time determination part 25 subtracts the preparation operation time predicted by the preparation operation time prediction part 24 from the processing completion time predicted by the processing completion time prediction part 23 to calculate preparation operation start time. Then, the preparation operation start time is compared with current time by a comparison part 250 and, when the current time reaches the preparation operation start time, the preparation start time determination part 25 outputs a preparation operation start command to the operation command part 26.

The operation command part 26 includes a workpiece replacing operation part 261 configured to output a workpiece replacing operation command, a preparation operation part 262 configured to output a preparation operation command, and a work operation part 263 configured to output a command of another work operation. The preparation operation part 262 outputs, when the preparation operation start command is output from the preparation start time determination part 25, a control signal to the servo motor 20 to drive the robot 2, and conveys the workpiece W from the initial position P0 to the first position P1. In other words, the robot 2 is caused to execute a preparation operation. At this time, the starting time of the preparation operation and the completion time of the preparation operation are respectively stored as preparation start time and preparation completion time in the storage part 22 as illustrated in FIG. 3.

When the preparation operation is completed and a processing completion signal is output from the signal output part 12 of the machine tool 1, the workpiece replacing operation part 261 outputs a control signal to the servo motor 20 to drive the robot 2 and the workpiece W is conveyed from the first position P1 to the second position P2. In other words, the robot 2 is caused to execute a workpiece replacing operation. When the workpiece replacing operation is completed, the workpiece replacing operation part 261 outputs a replacing completion signal to the machine tool controller 3. Accordingly, the machine tool 1 closes the door 1b to start processing of the workpiece W. The work operation part 263 outputs, before the start of the preparation operation, a control signal to the servo motor 20 to drive the robot 2, thereby causing the robot 2 to execute other work.

Figure 4:
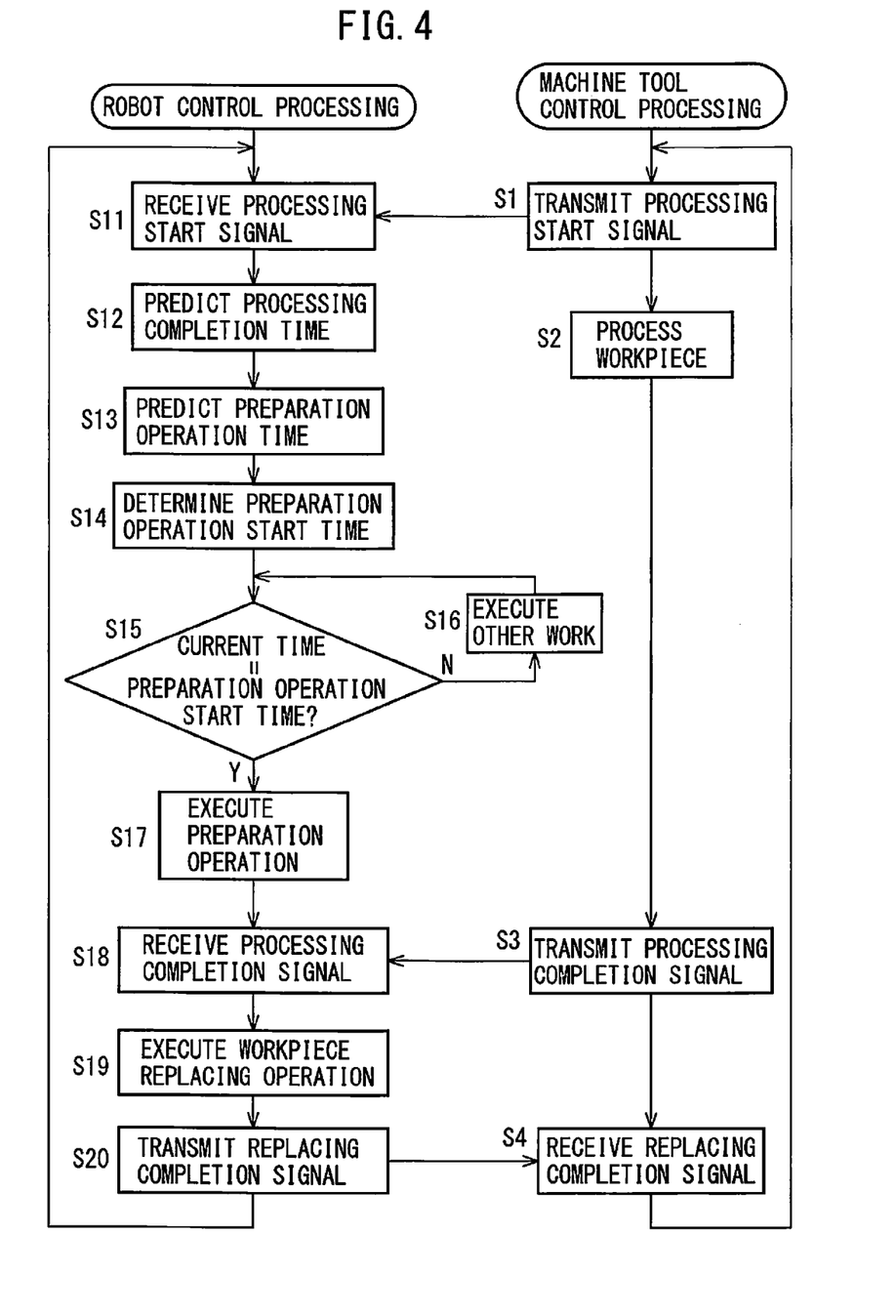
FIG. 4 is a flowchart illustrating an example of processing carried out in a machine tool controller and a robot controller illustrated in FIG. 2.

FIG. 4 is a flowchart illustrating examples of processing (machine tool control processing) carried out in the machine tool controller 3 and processing (robot control processing) carried out in the robot controller 4. First, the machine tool control processing will be described.

In Step S1, through processing of the signal output part 12, a processing start signal is transmitted to the input part 21 of the robot controller 4. At this time, the door 1b is closed. In Step S2, through processing of the operation command part 11, the machine tool 1 is controlled to execute processing of the workpiece W according to a predetermined processing program. When the processing of the workpiece W is completed, in Step S3, through the processing of the signal output part 12, a processing completion signal is transmitted to the input part 21 and, through the processing of the operation command part 11, an opening signal is output to the door driving actuator to open the door 1b. Then, the machine tool 1 stands by without executing any operation until a replacing completion signal of the workpiece W is transmitted from the operation command part 26 of the robot controller 4. This can prevent undesired interference of the robot 2 engaged in workpiece replacing operation with the machine tool 1.

In Step S4, when the replacing completion signal is received, through the processing of the operation command part 11, a closing signal is output to the door driving actuator to close the door 1b. Then, returning to Step S1, the same processing is repeated. In the repeated processing, the machine tool 1 processes a new workpiece W conveyed by the robot 2.

Next, the robot control processing will be described. In Step S11, when the input part 21 receives the processing start signal transmitted from the machine tool 1, current time is stored as processing start time in the storage part 22, and then the processing proceeds to Step S12. In Step S12, through processing of the processing completion time prediction part 23, an average value of processing time corresponding to a type of the workpiece W and a type of the machine tool 1 is calculated from a difference between the processing start time and the processing completion time stored in the storage part 22, and this processing time is added to the current time (processing start time) to predict processing completion time. Then, in Step S13, through processing of the preparation operation time prediction part 24, an average value of preparation operation time corresponding to the type of the workpiece W and the type of the machine tool 1 is calculated from a difference between the preparation start time and the preparation completion time stored in the storage part 22 to predict preparation operation time.

In Step S14, through processing of the preparation start time determination part 25, the preparation operation time is subtracted from the processing completion time to determine preparation operation start time. Then, in Step S15, through processing of the comparison part 250, whether the current time has reached the preparation operation start time or not is determined. When the judgment result is negative in Step S15, the process proceeds to Step S16. Through processing of the work operation part 263, the robot 2 is caused to carry out other work. When the judgment result is affirmative in Step S15, the process proceeds to Step S17. The preparation start time determination part 25 outputs a preparation operation start command and, through processing of the preparation operation part 262, a preparation operation is started. The current time is stored as preparation operation start time in the storage part 22. Accordingly, the workpiece W is conveyed from the initial position P0 to the first position P1. When the preparation operation is completed, the time is stored as preparation operation completion time in the storage part 22.

After completion of the preparation operation, in Step S18, a processing completion signal is received by the input part 21. Then, the processing proceeds to Step S19. In Step S19, through processing of the workpiece replacing operation part 261, the robot 2 is caused to execute a workpiece replacing operation. Accordingly, the workpiece W is conveyed from the first position P1 to the second position P2. When the workpiece replacing operation is completed, the processing proceeds to Step S20, and the workpiece replacing operation part 261 transmits a replacing completion signal to the machine tool controller 3. Then, returning to Step S11, the same processing is repeated.

The embodiment can provide the following operational effects.

(1) The processing system 100 includes the machine tool controller 3 for controlling the machine tool 1, and the robot controller 4 for controlling the robot 2. The machine tool controller 3 includes the signal output part 12 configured to output the processing start signal at the processing start time of the workpiece W. The robot controller 4 includes the operation command part 26 configured to output the operation command of the robot 2 so as to perform the preparation operation of conveying the workpiece W from the initial position P0 to the first position P1 and the workpiece replacing operation of conveying the workpiece W from the first position P1 to the second position P2, the processing completion time prediction part 23 configured to predict the processing completion time of the workpiece W in the machine tool 1 based on the processing start signal output from the signal output part 12, the preparation operation time prediction part 24 configured to predict time length necessary for the preparation operation of the robot 2, and the preparation start time determination part 25 configured to determine the start time of the preparation operation so that the preparation operation can be completed at the processing completion time based on the predicted processing completion time and the predicted preparation operation time. Thus, since the robot 2 performs the workpiece replacing operation immediately after the completion of the preparation operation, the standby time of the robot 2 after the completion of the preparation operation can be eliminated, and this can increase the operation rate of the robot 2.

(2) The robot controller 4 further includes the storage part 22 configured to store the processing start time and the processing completion time respectively corresponding to the processing start signal and the processing completion signal output from the signal output part 12. The processing completion time prediction part 23 predicts the processing completion time of the currently processed workpiece W based on the processing start time and the processing completion time for the processed workpiece W stored in the storage part 22. Thus, the processing completion time can be easily predicted.

(3) The storage part 22 stores the processing start time and the processing completion time for each workpiece type based on the workpiece identification signal output from the signal output part 12, and the processing completion time prediction part 23 predicts the processing completion time of the currently processed workpiece W based on the processing start time and the processing completion time of the processed workpiece W stored in the storage part 22 and similar in type to the currently processed workpiece W. Thus, the processing completion time can be accurately predicted.

(4) The storage part 22 stores start time and completion time for each execution of the preparation operation, and the preparation operation time prediction part 24 predicts the current preparation operation time based on the past preparation start time and preparation completion time stored in the storage part 22. Thus, the preparation operation time can be easily predicted.

(5) The robot 2 performs the workpiece replacing operation after the reception of the processing completion signal from the machine tool 1 (Steps S18 and S19). Thus, even when a predicted value of the processing completion time or the preparation operation time is different from the actual processing completion time or the preparation operation time, the robot 2 does not start the workpiece replacing operation before the machine tool 1 completes the processing. Thus, the operation is very safe.

(6) The robot 2 performs the other work until the current time reaches the preparation operation start time (Steps S15 and S16). Thus, the standby time before the preparation operation start can be shortened, and this can increase the operation rate of the robot 2.

According to the embodiment, the signal output parts 12 are provided in the plurality of machine tools 1 to output the processing start signal at the processing start time of the workpiece W. However, the number of machine tools may be one. According to the embodiment, by the preparation operation (first operation), the workpiece W is conveyed to the first position P1 facing the surface of the door 1b of the machine tool 1. However, no door 1b may be provided in the machine tool 1. The first position 21 is not limited to the position described above, as long as the position is near the processing region 1a of the machine tool 1. Thus, when the workpiece W is conveyed from the first position P1 to the second position P2 of the processing region 1a by the workpiece replacing operation (second operation), the robot 2 may not perform the second operation via the door 1b of the machine tool 1. In other words, the configuration of the preparation operation part 262 and the workpiece replacing operation part 261 included in the operation command part 26 is not limited to that described above.

According to the embodiment, the processing start signal and the processing completion signal of the processed workpiece W are stored in the storage part 22 serving as the processing time storage part, and the processing completion time of the currently processed workpiece W is predicted based on the processing start signal and the processing completion signal stored in the storage part 22. However, any configuration may be employed for the processing completion time prediction part 23 serving as the time prediction part as long as the processing completion time of the workpiece W in the machine tool 1 is predicted based on the processing start signal output from the signal output part 12. According to the embodiment, the first operation time necessary for the current preparation operation is predicted based on the time necessary for the preparation operation stored in the storage part 22 serving as the conveying time storage part, in other words, the past first operation time that is the difference between the preparation start time and the preparation completion time. However, the configuration of the preparation operation time prediction part 24 serving as the time length prediction part is not limited to this.

According to the embodiment, the preparation operation start time enabling the preparation operation to be completed at the processing completion time is determined based on the processing completion time predicted by the processing completion time prediction part 23 and the preparation operation time predicted by the preparation operation time prediction part 24. However, the configuration of the preparation start time determination part 25 serving as the time determination part is not limited to that described above. The configuration of the robot 2 that conveys the workpiece W to the machine tool 1 and the configuration of the machine tool 1 are not limited to those described above. The present invention can be applied to a processing system including various machine tool controllers and robot controllers.

According to the present invention, since the first operation of the robot is completed when the machine tool completes the processing, the robot can start the second operation immediately after the completion of the processing, and the operational efficiency of the robot can be improved.

The embodiment can be arbitrarily combined with one or a plurality of modified examples.

The present invention has been described by way of preferred embodiments. As obvious to those skilled in the art, various changes and modifications can be made without departing from the disclosure scope of the appended claims.

The invention claimed is:

1. A processing system comprising:
a machine tool controller for controlling a machine tool; and
a robot controller for controlling a robot, wherein,
the machine tool controller includes a signal output part configured to output a processing start signal at a processing start time of a workpiece, the robot controller includes:
an operation command part configured to output an operation command of the robot so as to perform a first operation of conveying the workpiece from an initial position to a first position adjacent to the machine tool and a second operation of conveying the workpiece conveyed to the first position to a second position in a processing region of the machine tool;

a time prediction part configured to predict a processing completion time of the workpiece in the machine tool based on the processing start signal output from the signal output part;

a time length prediction part configured to predict time length necessary for the first operation of the robot; and a time determination part configured to determine start time of the first operation so that the first operation is completed at the processing completion time based on the processing completion time predicted by the time prediction part and the time length predicted by the time length prediction part, the signal output part further outputs a processing completion signal at the processing completion time of the workpiece, the robot controller further includes a processing time storage part configured to store processing start time and processing completion time respectively corresponding to the processing start signal and the processing completion signal output from the signal output part, the processing time storage part stores processing start time and processing completion time for each machine tool, the time prediction part predicts processing completion time of a currently processed workpiece based on processing start time and processing completion time of a processed workpiece, which is stored in the processing time storage part for each machine tool, the robot controller further includes a conveying time storage part configured to store first operation time necessary for the first operation each time the first operation is completed, and the time length prediction part predicts current time length necessary for the first operation based on the past first operation time stored in the conveying time storage part.

2. The processing system according to claim 1, wherein the signal output part outputs, in addition to the processing start signal and the processing completion signal, a workpiece identification signal according to a type of a workpiece, the processing time storage part stores the processing start time and the processing completion time for each workpiece type based on the workpiece identification signal output from the signal output part, and the time prediction part predicts the processing completion time of the currently processed workpiece based on the processing start time and the processing completion time of the processed workpiece stored in the processing time storage part.

* * * * *